F. H. WOOLF.
COATING MACHINE.
APPLICATION FILED AUG. 23, 1913.

1,132,895.

Patented Mar. 23, 1915.
6 SHEETS—SHEET 1.

Witnesses:

Inventor
Frank H. Woolf
By William L. Hall
Atty's

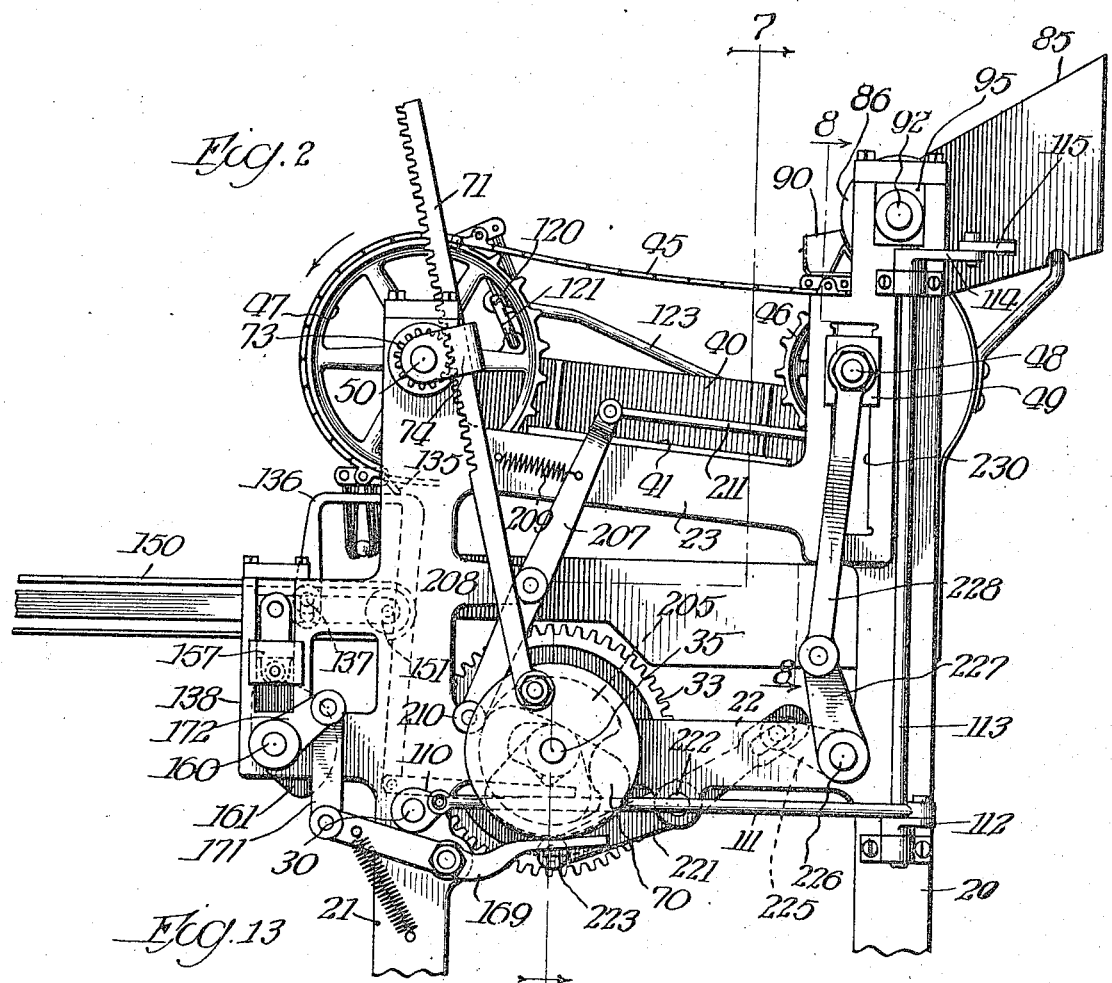

F. H. WOOLF.
COATING MACHINE.
APPLICATION FILED AUG. 23, 1913.

1,132,895.

Patented Mar. 23, 1915.
6 SHEETS—SHEET 3.

Witnesses

Inventor
Frank H. Woolf
By William L. Hall
Atty.

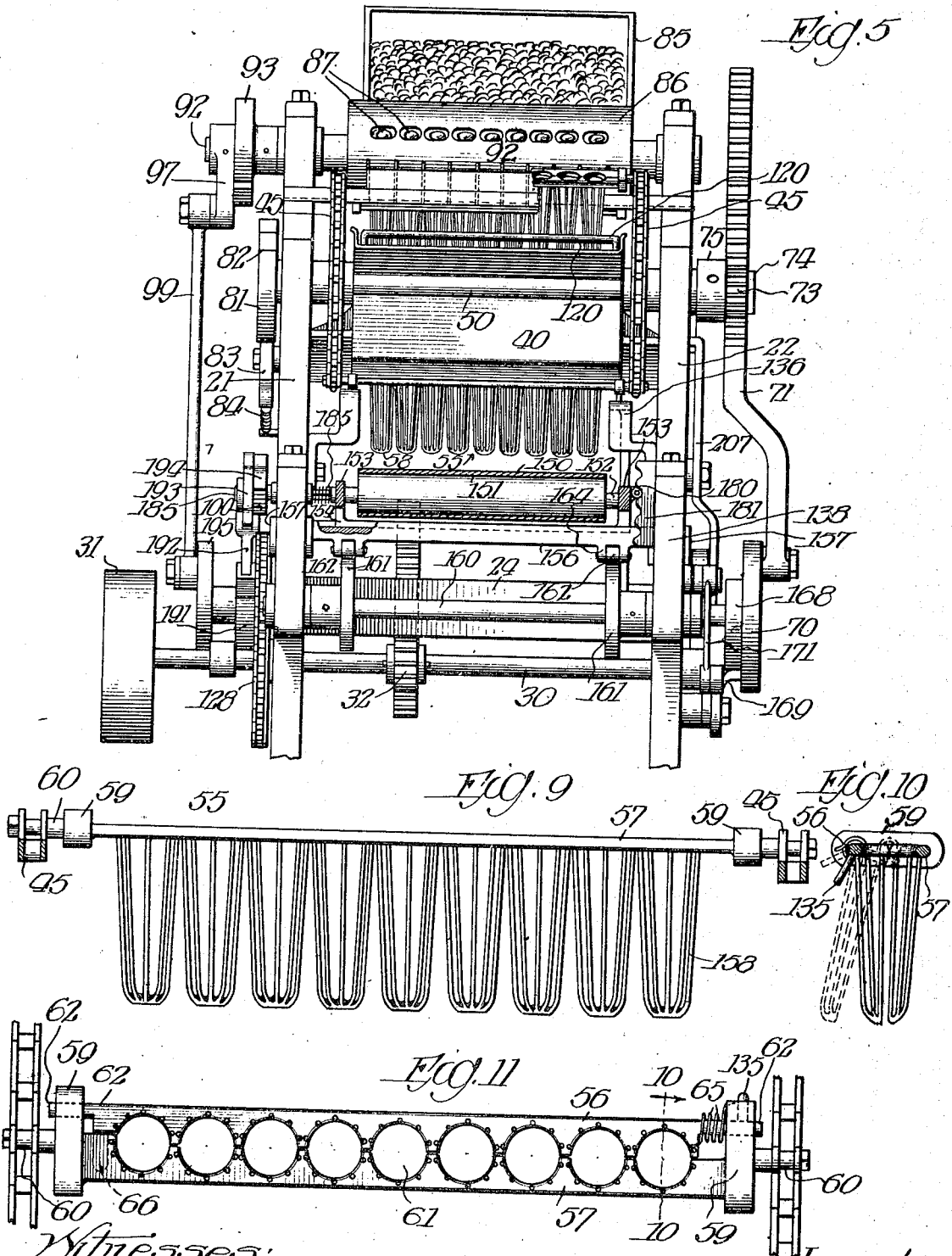

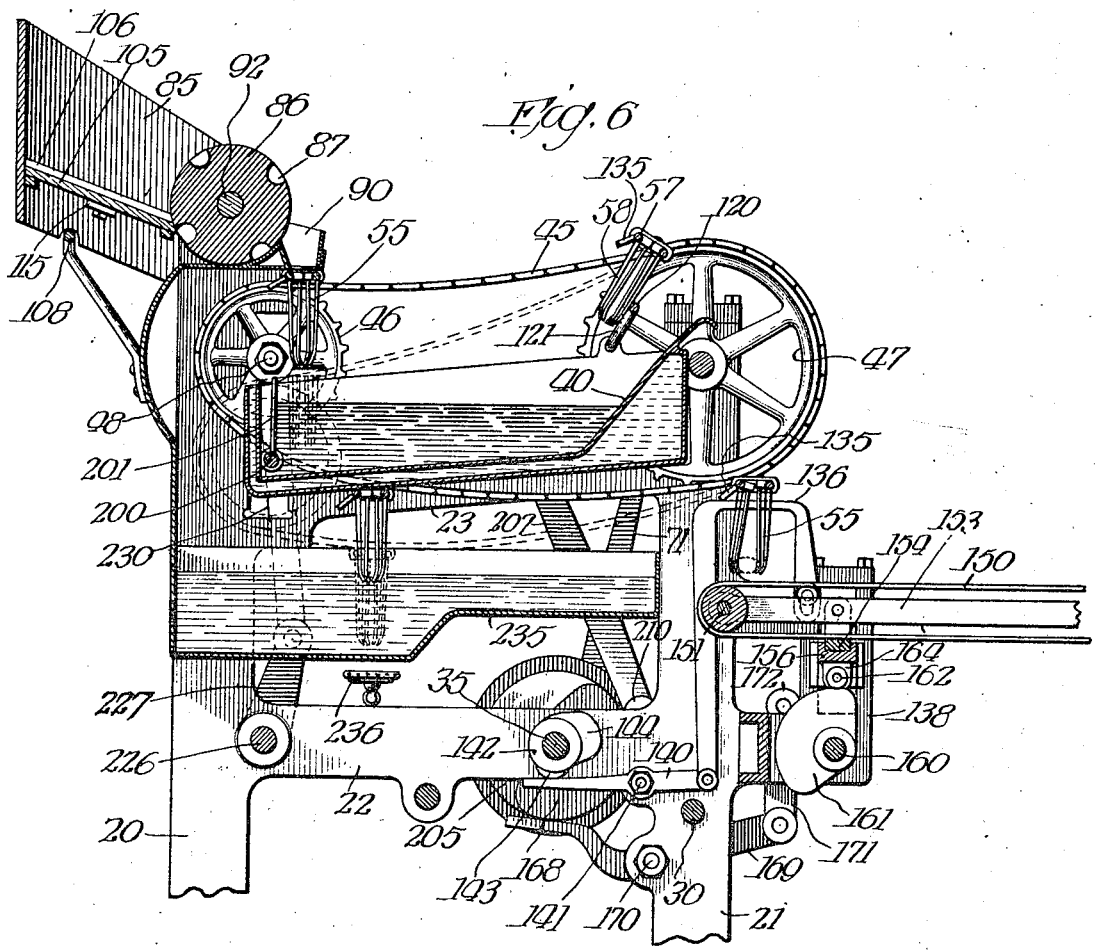
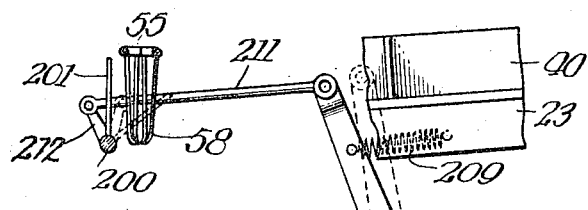
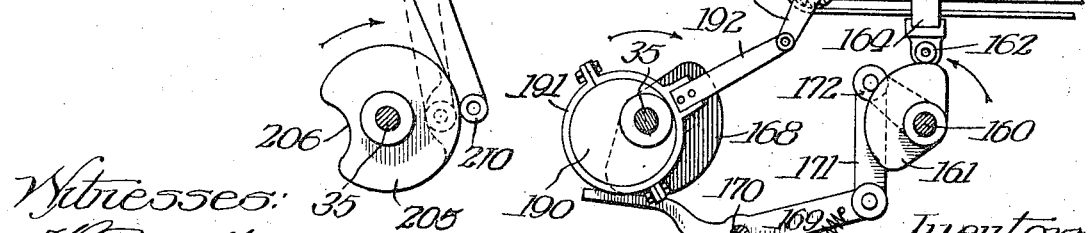

F. H. WOOLF.
COATING MACHINE.
APPLICATION FILED AUG. 23, 1913.
1,132,895.
Patented Mar. 23, 1915.
6 SHEETS—SHEET 6.
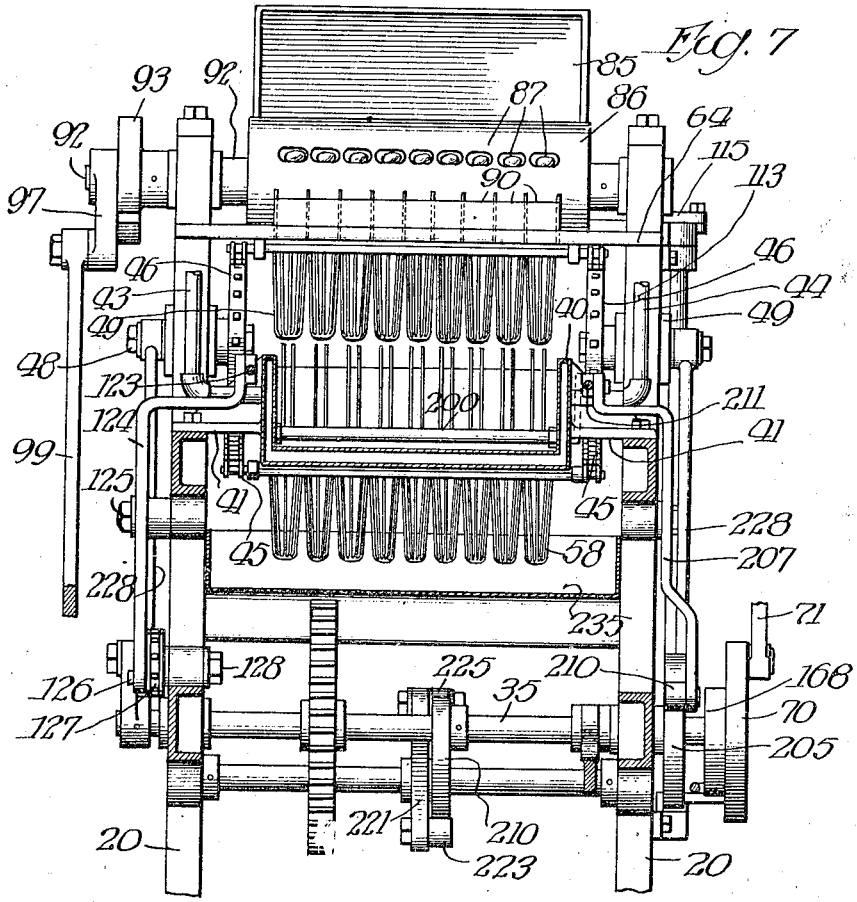
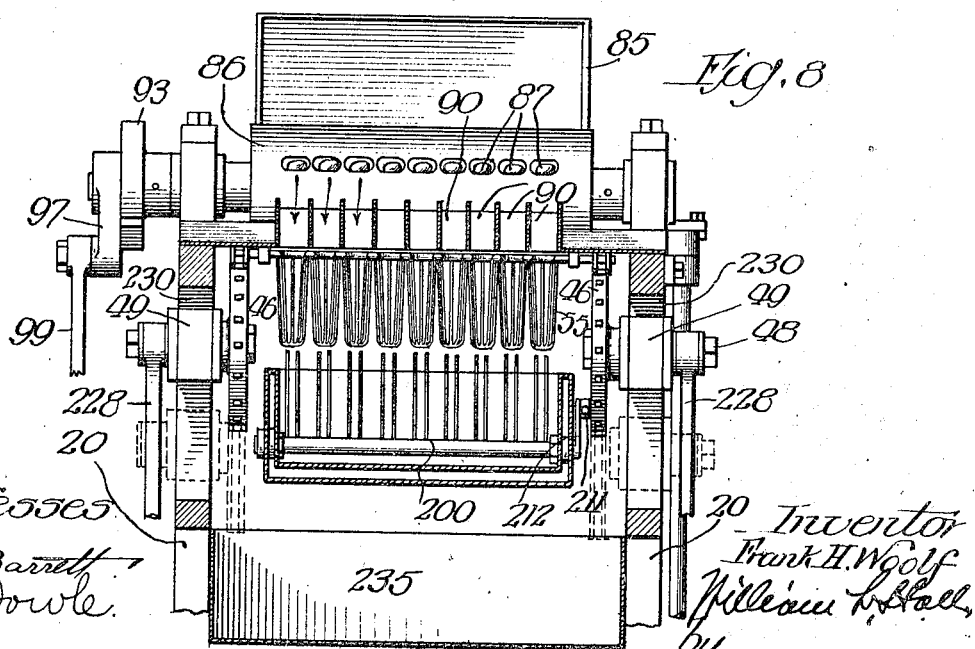

UNITED STATES PATENT OFFICE.

FRANK H. WOOLF, OF CHICAGO, ILLINOIS, ASSIGNOR TO HENRY HARFST, FRANK H. JUDD, AND THOMAS M. SULLIVAN, ALL OF CHICAGO, ILLINOIS.

COATING-MACHINE.

1,132,895.  Specification of Letters Patent.  Patented Mar. 23, 1915.

Application filed August 23, 1913. Serial No. 786,206.

*To all whom it may concern:*

Be it known that I, FRANK H. WOOLF, a citizen of the United States, and a resident of Chicago, in the county of Cook and State of Illinois, have invented certain new and useful Improvements in Coating-Machines; and I do hereby declare the following is a full, clear, and exact description thereof, reference being had to the accompanying drawings, and to the characters of reference marked thereon, which form a part of this specification.

This invention relates to a novel machine for coating confections or nuts, such as peanuts, pecans and bon bons with a coating of chocolate, icing or the like, and the invention consists in the matters hereinafter set forth and more particularly pointed out in the appended claims.

Among the objects of the invention is to provide a simple and compact machine having large capacity for automatically and continuously coating nuts, confections and the like with any suitable coating layer.

I have herein illustrated one approved form of machine in which my invention is embodied, but it will be understood from the following description that the invention, in its broader aspect, is capable of other embodiments and that, therefore, the invention is not limited to the structural details herein shown except as such details are made the subject of specific claims.

Figure 1:
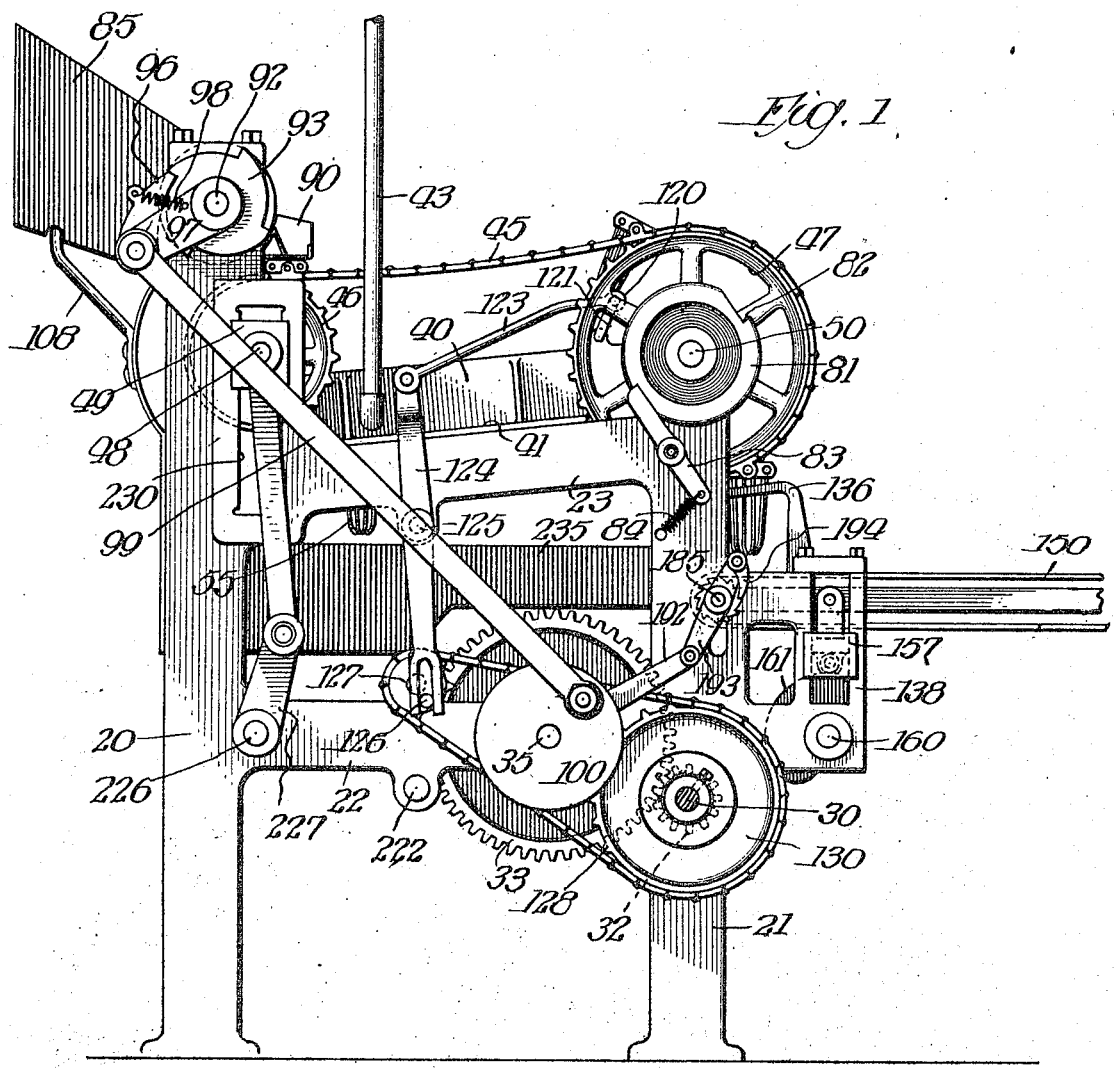
Figure 17:
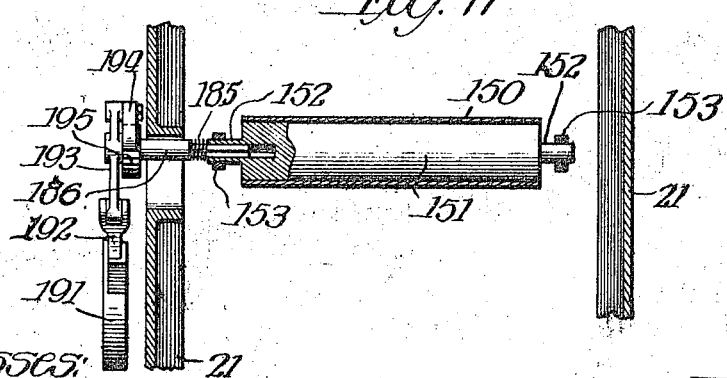
Figure 3:
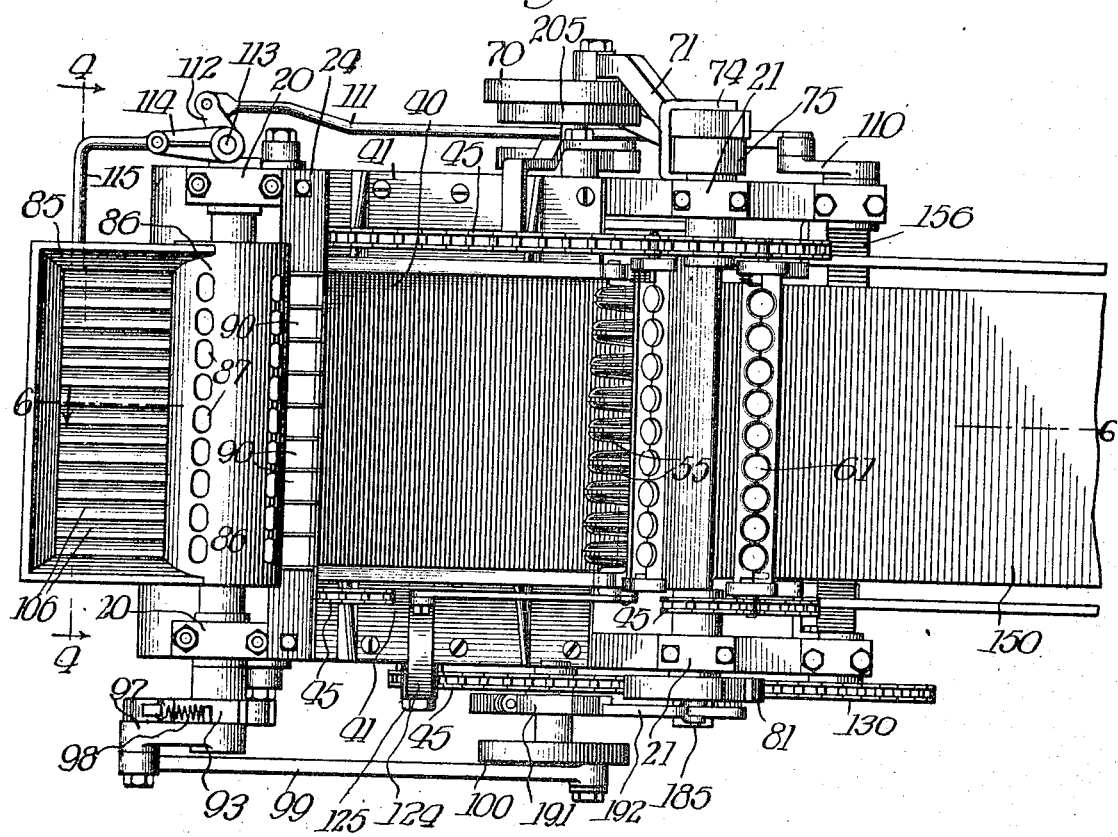
Figure 4:
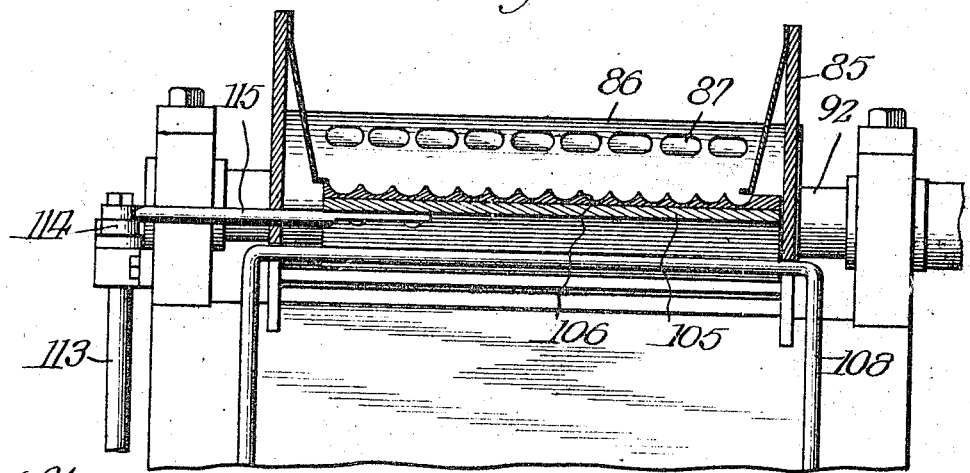

In the drawings:—Figure 1 is an elevation of the right hand side of the machine, as viewed from the rear end thereof, with parts broken away. Fig. 2 is an elevation of the reverse side of the machine. Fig. 3 is a plan view of the machine. Fig. 4 is a vertical section on the line 4—4 of Fig. 3. Fig. 5 is a rear elevation of the machine, with parts broken away. Fig. 6 is a vertical section on the line 6—6 of Fig. 3. Fig. 7 is a vertical section on the indirect line 7—7 of Fig. 2. Fig. 8 is a vertical section on the line 8—8 of Fig. 2. Fig. 9 is a side elevational detail of one of the groups of baskets or containers by which the product to be coated is carried through the coating bath. Fig. 10 is a cross section on the line 10—10 of Fig. 11. Fig. 11 is a plan view of said parts. Fig. 12 is a detail, to be hereinafter described, illustrating the means for raising and lowering the forward portion of the carrier. Figs. 13 and 14 are details of a clutch constituting part of the carrier driving mechanism. Fig. 15 is a fragmentary detail illustrating the mechanism for forcing the product into the baskets when delivered thereto by the feed mechanism. Fig. 16 is a detail illustrating the means for operating the take off belt and for raising and lowering the same, for a purpose hereinafter to be described. Fig. 17 is a detail of the forward roller of the take off belt and mechanism for operating said roller.

As shown in the drawings, the frame of the machine consists principally of two side members embracing front and rear standards 20, 21 and connecting members 22, 23. Said side members may be joined by suitable transverse frame members 24 (one of which is shown in Fig. 5) which may be located and arranged in any preferred manner.

30 designates the main driving shaft of the machine mounted in the rear standards 21 and provided with a pulley 31 through which driving power is transmitted to the machine. Said shaft is provided with a pinion 32 that meshes with a large gear wheel 33 of a secondary shaft 35 which latter is mounted in the lower side members 22 of the frame. (Figs. 1 and 2.)

40 designates an open topped receptacle, arranged lengthwise of the machine, to contain a fluid coating material through which the product is passed to be coated. This receptacle is removably supported, through the medium of brackets 41, on the upper side members 23 of the frame. The said receptacle is made with hollow walls, as most clearly shown in Fig. 6 so as to permit a heating agent to circulate therethrough to maintain the coating at the desired temperature and at a proper consistency. This heating agent may be steam or hot water circulated through the hollow walls of the receptacle 40, as by means of the circulatory pipes 43, 44, as best shown in Figs. 1 and 7.

The carrier mechanism by which the product is carried through said receptacle 40 and in contact with the coating material therein comprises, in the present instance, two endless chains 45, 45, which are trained about front and rear pairs of pulleys 46, 47, respectively, the former fixed to shafts 48 which are mounted in bearings 49 carried by the frame, and the latter fixed to a shaft 50 which is mounted in fixed bearings at the upper ends of the rear frame standards 21. The bearings 49 of the rear shafts are vertically movable for a purpose, and by a mechanism, hereinafter to be described. The carrier embraces also a group of baskets or like containers, designated as a whole by 55, arranged transversely across the machine and into which the product is delivered by a suitable feed mechanism, and by which it is carried through the coating bath. For the sake of clearness, the container, which is herein shown as of general basket form, will be termed a basket, but this term is not intended to restrict the container to any particular form or construction.

Each group of containers embraces as part of its construction two parallel bars 56, 57 arranged transversely of the receptacle 40 from which depend wires 58 that are assembled to form a plurality of baskets, as best shown in Figs. 9, 10 and 11. The bar 57 of each group is formed at its ends with transverse lugs 59 from which extend trunnions 60 that are rockingly mounted in the carrier chains 45 whereby the groups of baskets are permitted to tip or rock relatively to said carrier chain. The said transverse members 56, 57 are formed with registering recesses to provide a series of openings 61 that constitute the open tops or the receiving mouths of the baskets. The wires 58 which constitute each individual basket are turned inwardly at their lower ends to constitute the bottoms of the baskets. A portion of the wires constituting each basket depend from and are attached to one of the transverse members of the carrier, and another portion is attached to and depends from the other transverse member, as most clearly shown in Figs. 10 and 11; and one of the transverse members, the member 56 as herein shown, is adapted to be rocked away from the other member so as to carry the portion of the basket wires supported thereby away from the other portion, of the basket wires, and to thereby open the basket as indicated in dotted lines in Fig. 10, to permit the coated product to drop out of the basket.

This result is effected, as herein shown, by providing the member 56 of the carrier with trunnions 62 that are rockingly mounted in bearings in the lugs 59 of the other transverse member 57. A torsion spring 65 surrounds one of said trunnions and engages at its ends the adjacent lug 59 and the member 56 and tends to normally hold the basket closed. A stop lug 66, indicated in dotted lines in Fig. 11, limits the rocking movement of the member 56 toward the closing position of the baskets. The said baskets are automatically opened at the proper time in the movement of the carrier and after the baskets have passed through the coating bath, in a manner hereinafter to be described.

The carrier is automatically and intermittently actuated in such manner that the movement thereof is arrested at the time one group of baskets is in position to receive the product from the feed mechanism and another group of baskets is in position to discharge the coated product therefrom. The mechanism for so automatically and intermittently actuating the carrier is made as follows: 70 designates a crank disk fixed to the secondary shaft 35, to which is eccentrically and loosely connected one end of a reciprocating rack bar 71. The upper end of said bar extends upwardly and rearwardly toward the carrier actuating shaft 50. The teeth of said rack bar mesh with a pinion 73 that is loosely mounted on the carrier actuating shaft 50, and said rack bar is guided in its reciprocating movement and held in mesh with said teeth by means of a suitable guide 74. The said pinion 73 is free to turn on the shaft 50 in clock-wise direction and when turning in this direction transmits no movement to the shaft 50, as when the rack bar moves downwardly under the action of the crank disk 70. A clutch device is interposed between the pinion 73 and a part fixed to the shaft 50, whereby, when the rack bar is moved upwardly and the pinion is turned in a counter clock-wise direction rotary motion is transmitted to the shaft and therethrough motion is imparted to the carrier. A suitable form of clutch device for this purpose is shown in Figs. 13 and 14 and is made as follows: 75 designates a disk that is keyed to or otherwise fixed to the shaft 50 at the side of pinion 73. Said disk is provided on its face adjacent to said pinion with sockets 76 to receive dogs 77 that are adapted to be projected outwardly by springs 79 into the notches 80 of the adjacent face of the pinion. The said dogs and notches are each formed with one tapered face and one abrupt face and are arranged in such manner that when the pinion is rotated in one direction i. e. clock-wise direction, the interacting tapered faces of the dogs and notches act to force the dogs backwardly into the sockets 76 against the action of the springs 79 and out of the notches 80, thereby transmitting no movement to the shaft 50. When, however, the pinion is rotated in the opposite direction, by the upward movement of the rack bar 71, the abrupt faces of the dogs engage like faces or walls of the notches so as to constitute a driving connection between the said pinion and said disk, and thereby, the carrier.

In order to prevent back lash of the shaft 50 and the carrier actuated thereby when the actuating rack bar 71 is retracted, and thereby allow the baskets to get out of time relatively to the other movements of the machine, the said shaft 50 is herein shown as provided at the right hand side of the machine with a notched disk 81, adapted to be engaged by a holding dog 83 which is pivotally mounted in the machine frame and is held with its free end pressed toward the periphery of the disk by a spring 84, as most clearly shown in Figs. 1 and 3. In the arrangement shown, each step of the carrier movement is effected during one-half of a rotation of the shaft 50, so that the disk 81 is provided with two notches 82 for engagement by the dog 83.

The feed mechanism herein shown for feeding the product to the groups of baskets as each group is arrested in position to receive the product is made as follows: 85 designates a hopper to contain the product. It is supported in any suitable manner at the front end of the machine frame and at a level above the carrier. 86 designates a feed roll which extends across the rear open side of the hopper and is provided with a plurality of pockets 87, equal in number and laterally spaced to correspond with the spacing of the baskets. The said feed roll is intermittently rotated by means, hereinafter to be described, to transfer the pieces of product from the hopper to the baskets. The said individual pieces of product are guided from the pockets of said feed roll to the baskets by means of a series of guide chutes 90 formed in a structure that is arranged in rear of the feed roll, as most clearly shown in Figs. 6, 7 and 8. Each group of baskets, when brought to the loading position thereof, stops immediately beneath the bottom wall of the guide chute structure, as shown in Fig. 6, and remains there until the feed roll 86 has been intermittently rotated to deposit a charge of product into said chutes, and therethrough into the baskets. The said feed roll is intermittently rotated in proper timed relation to the carrier operating mechanism through means herein shown made as follows: Fixed to one end of the shaft 92 on which the feed roll is mounted is a ratchet wheel 93 (Fig. 1) said shaft being mounted in bearings 95 carried by the upper ends of the front standards 20 of the machine frame. 96 designates a pawl which is pivoted to a crank arm 97, and said pawl engages at its free end the teeth of the ratchet wheel 93, it being normally pressed thereagainst by the spring 98. 99 designates a link which is loosely connected at its upper end to said crank arm 97 and extends rearwardly and downwardly and is loosely and eccentrically connected to a disk 100 fixed to the end of the secondary shaft 35. Upon rotation of the crank disk 100 in the direction indicated by the arrow, the feed roll is rotated rearwardly an angular distance equal to the angular distance between the groups of pockets 87 therein, and this distance is such as to carry a group of pockets to and slightly past the feeding position, or the position in which the product is discharged, through the guide chutes 90 into the baskets. As herein shown there are four groups of pockets in the feed roll, and the ratchet wheel 93 is therefore, provided with four like spaced teeth. The said feed roll driving mechanism is so timed, relatively to the carrier driving mechanism, that the feed roll is stationary while the carrier is actuated to move one group of baskets to the discharge position thereof, and another group of baskets into position to receive the product from the feed roll. Thereafter the feed roll is moved rearwardly one step during the period of inaction of the carrier to charge or load the baskets.

In order to facilitate the feeding of the product from the hopper to the pockets of the roll, the inclined bottom wall 105 of the hopper is formed with a plurality of transverse grooves 106 to guide the product into the pockets. In order to further facilitate such feeding action I may provide means for laterally shaking the hopper so as to insure the feeding movement of the product to the feed roll pockets, and prevent the product from becoming packed in the bottom of the hopper. For this purpose, the hopper may be slidingly supported on a loop like bracket 108, as shown in Fig. 4, whereby the hopper may slide endwise on its support, or transversely to the machine. One practical means for shaking the hopper is shown most clearly in Figs. 2, 3 and 4 and is made as follows: 110 designates a crank that is fixed to the main driving shaft 30 at the right hand end of the machine. 111 designates a link that is loosely connected at one end to said crank and at the other end to a crank arm 112 at the lower end of a rock shaft 113, suitably mounted on the frame, as shown in Fig. 2. At the upper end of said rod is a crank arm 114 which is loosely connected to a link 115 that extends inwardly toward and is attached to the bottom of the hopper, in a manner shown most clearly in Fig. 4. The hopper is thereby continuously shaken or vibrated during the rotation of the main driving shaft.

The baskets, after having passed, with their charges of product, through the coating bath, are preferably subjected to a shaking operation, just before they reach their unloading positions, in order to shake off from the baskets and the product therein any excess of coating material that may cling thereto. The shaking mechanism herein shown for this purpose, and best illustrated in Figs. 1, 2, 5 and 6 and is made as follows: 120 designates a shaker bar that extends transversely across the upper open side of the coating bath receptacle 40. It is provided at its ends with downturned arms 121 that are rockingly mounted in lugs that extend upwardly from the side walls of the receptacle, whereby the bar 120 is free to swing about the axes of the bearing ends of said arms. 123 designates a link that is loosely connected at one end thereof to said bar, and is loosely connected at the other end thereof to the upper end of a vertical, vibratory lever 124 that is pivoted to the machine frame at 125. The lower end of said lever 124 is forked to engage over a pin or stud 126 that extends laterally from a sprocket disk or wheel 127 that is rotatively mounted on a stub shaft 128 fixed to the frame of the machine. The said sprocket wheel 127 is driven by a belt 128 from a sprocket wheel 130 that is fixed to the main driving shaft 30. The relation of the diameters of the said sprocket wheels 127 and 130 is such that the shaking bar 120 is given a relatively rapid vibratory movement. The intermittent driving mechanism for the carrier is so arranged that one group of baskets stops over and in contact with the vibratory shaking bar at the end of each step of movement of the carrier and there remains during the time the next group in rear thereof is being charged, so that the baskets in contact with the shaking bar and their contents are fairly shaken.

Referring now to the mechanism for discharging the coated product from the baskets after the baskets have been thus subjected to the shaking operations, the same is made as follows: The trailing members 56 of the pairs of transverse bars 56 and 57, and which are under the influence of the torsion springs 65, are provided with tripping pins or lugs 135 that extend downwardly and forwardly therefrom. The said tripping pins or lugs are located in the path of, what may be termed, a "tripping cam" designated, as a whole, by 136. This tripping cam consists of a general U-shaped member that is loosely connected to 137 to an extension 138 at the left hand side of the machine frame. The horizontal portion of the tripping cam lies in the path of the tripping pins 135. The free end of the tripping cam extends downwardly beyond its pivoted end and is loosely connected at its lower end to one end of an actuating lever 140, which lever is pivoted between its ends at 141 to the machine frame. The other end of said lever 140 is in contact with and is adapted to be actuated by a cam 142 fixed to the secondary shaft 35. The said cam 142 has two eccentric projections 143, 144 thereon, herein shown as spaced somewhat more than 90° apart. When the free end of said lever 140 is riding on the concentric part of the cam 142, the tripping cam 136 lies below the level of the path of the tripping pins 135. The eccentric projection 143 of the cam 142 is of less length than the projection 144 for the following reason: The engagement of the shorter projection 143 with the lever 140 acts to partially open the baskets and, while the arm is in contact with the concentric part of the cam 142 between the cam projections, the baskets again close. Thereafter, when the projection 144 of the cam 142 strikes the lever 140, the tripping cam 136 is raised high enough to fully open the baskets. The purpose of this construction and operation is to insure that the coated product will be discharged freely from the baskets. If the baskets were opened at once and for the short time given for such opening movement, the coated product might tend to stick to the baskets. However, the partial opening and closing of the baskets, followed by the full opening thereof, serves to completely dislodge the product from the baskets.

As a further and separate improvement, I have provided means for marking the coated product after it has been discharged from the baskets and while on the take-off belt, by strings of coating material that drip from the baskets after the product has been discharged therefrom and upon the belt. The method herein disclosed for effecting this result consists in giving to the receiving portion of the take-off belt a lateral shaking movement relative to the group of baskets above the same, so that the coated product deposited upon the belt passes a number of times in opposite directions beneath the dripping baskets to receive the marking. The means herein shown for effecting such marking of the product embraces means for raising the frame and belt toward the baskets at their discharging or unloading position, combined with means for laterally shaking said frame and belt during the descending movement of the belt and its frame. The means herein shown for effecting this result are made as follows: 150 designates an endless take-off belt which is trained about a driving roller 151, the trunnions 152 of which are rotatively mounted in bearings in the forward ends of the frame bars 153 which are connected by a transverse bar 154. Said belt frame bar 154 has sliding motion on the transverse bar 156 that supports the forward end of the frame of the take-off belt, as shown in Fig. 6. Said bar 156 is provided at its ends with bearings 157 that slide in vertical guide grooves of the extension frame 138. It has an upwardly opening groove to receive the belt frame bar 154 to hold the latter bar in place and guide it in its sliding movement. The other, or rear, end of the take-off belt frame is not herein shown, but it will be understood that it is suitably supported on the floor to permit the forward end of the belt frame to rise and fall and it carries an idle roller about which the rear portion of the take-off belt is trained.

160 designates a rock shaft mounted in suitable bearings in the extension frame 138. Fixed to the said rock shaft are rocking cams 161, 161. Upon the peripheries of these cams ride rollers 162 which are mounted in depending bearings 164, 164 carried by the belt frame supporting bar 156. Consequently the rocking movement of the cams 161 of the take-off belt is once raised while the rollers 162 are riding on the eccentric portions of the cam and is lowered as the rollers 162 drop to the concentric portions of the cams. The said rocking shaft 160 is rocked through the medium of a cam 168 fixed to the secondary shaft 35 at the left hand side of the machine, a lever 169 is pivoted between its ends at 170 to the machine frame and is spring pressed to yieldingly engage at one end the periphery of the rotating cam 168. The other end of the lever 169 is connected by a link 171 to a crank arm 172 of the rocking cam shaft 160. During each rotation of the secondary shaft 35 therefore, the rocking cam is actuated once to raise the take-off belt frame and hold it in its upper position for a prescribed period, and to thereafter allow said frame and take-off belt to descend. The raising and lowering mechanism is so timed, relatively to the secondary shaft 35 that the take off belt is raised before the baskets are lowered to their discharge position, and is rapidly lowered as soon as the product has been discharged therefrom. The mechanism for imparting to the take off belt and its frame a laterally vibratory motion during its vertical movement is made as follows. One of the side members of the said laterally movable take off belt driving roller carrying frame is provided with a roller 180 which is pressed against a roughened or fluted edge of a plate or block 181 fixed to an adjacent part of the machine frame. The said belt frame is pressed toward the fluted plate or block by means of a coiled, expansion spring 185 which surrounds the driving shaft 186 of the roller 151, said driving shaft being herein shown as made square to fit a squared opening in the roller and its trunnion, whereby the roller has longitudinal movement relatively to its driving shaft. With this construction, when the take off belt and its frame is moved vertically, contact of the roller 180 with the fluted plate 181 has the effect to give lateral vibration to the belt frame and roller, and thereby to the belt carried for the purpose set forth; this movement of the belt driving roller and its sliding frame 154 being independent of the bar 156. The descending movement of the take off belt frame is comparatively rapid, by reason of the quick descent of the cam 161, (Fig. 16) so that lateral movement of the belt and the row of coated product thereon under the dripping baskets is comparatively rapid.

The means for driving the take off belt roller 151 and for giving movement to the belt 150 is most clearly shown in Figs. 1 and 16 and is made as follows: 190 designates an eccentric fixed to the secondary shaft 35 at the right hand side of the machine. The strap 191 of the said eccentric is fixed to the jointed lever which consists of two members 192, 193 which are hinged or loosely connected at their adjacent ends. The member 193 is pivotally connected between its ends to the driving shaft 185 of the roller 156 and carries at its free end a pawl 194 which is spring held against a ratchet wheel 195 that is fixed to the end of the shaft 185 exterior to the right hand side of the machine frame. The jointed lever and pawl and ratchet connections described enable the driving roller to accommodate itself to the fixed axis of the secondary shaft 35 in all vertical positions of the roller 156 and of the take-off belt frame. This construction gives intermittent movement to the take-off belt to correspond to the movement of the carrier, and the parts are so timed that the take-off belt is stationary when the baskets are in position to discharge the coated product thereon, and is intermittently moved during a portion of the intermittent movement of the carrier.

In order to insure that the pieces of product shall fall to the bottoms of the baskets of the carrier, and to thereby insure the submersion of the product in the coating bath, I provide mechanism which operates, just after the pieces of product have been deposited in the baskets, to press said pieces of product to the bottoms of the baskets. This embodiment of my invention, as herein shown, embraces the following mechanism: 200 (Figs. 7, 8, and 15) designate a rock shaft which extends transversely across the front end of the coating bath receptacle near the bottom thereof and in front of the loading positions of the baskets. The said rock shaft is provided with a plurality of fingers 201 which, when the rock shaft is rocked rearwardly, pass rearwardly and downwardly between the wires constituting the baskets so as to thereby force the pieces of product to the bottoms of the baskets, as indicated in dotted lines in Fig. 15. The means for rocking the shaft 200 to effect this result are made as follows: 205 designates a cam which is fixed to the secondary shaft 35. Said cam is concentric throughout the greater portion of its periphery to the axis of said shaft, and is provided with a relatively short eccentric notch 206. 207 designates a swinging lever which is pivoted to an extension 208 of the frame, and is placed under the influence of the contractile spring 209, which acts to hold the roller 210 against the periphery of the cam. A link 211 connects the upper end of the swinging lever 207 to a crank arm 212 rigid with the shaft 200. During the time the roller 210 is riding on the concentric portion of the cam 205 the fingers 201 are held upright in front of the baskets. When, however, the roller engages the depression or eccentric portion of the cam, the spring 209 draws the fingers forwardly to the dotted line position shown in Fig. 15, and thereby forces the product delivered to the baskets to the bottoms of the latter.

As a further and separate improvement, means are provided to raise and lower the forward shafts 48 of the carrier and to thereby raise and lower the forward portion of the carrier. This construction enables the carrier, carrying the depending baskets, to be raised and lowered so that the lower ends of the baskets will clear the forward wall of the coating bath receptacle 40 and at the same time permit the carrier to be lowered so that the parts of the baskets to which the pieces of product are delivered, will be submerged in the coating bath and will pass for a portion of the length of the bath receptacle thus submerged. The mechanism whereby this raising and lowering of the forward carrier roller shafts is effected is most clearly shown in Figs. 1, 2, 7 and 12, and is made as follows: 220 designates a cam which is fixed to the secondary shaft 35. 221 designates a lever which is pivoted between its ends at 222 to the machine frame and is provided at one end with a roller 223 that engages and travels on the periphery of said cam. The other end of the lever has a loose or slotted connection with a crank arm 225 fixed to a rock shaft 226 that extends transversely across the forward end of the machine frame. The said rock shaft 226 is provided at both its ends with other crank arms 227, 227, and said latter crank arms are connected by links 228, 228 with the ends of the rear supporting shafts 48 of the carrier. As before stated, the shafts 48 are mounted in vertically movable bearings 49. These bearings are mounted in vertically slotted guides 230, 230, arranged one at each side of the machine frame. When the roller 223 of the lever 221 is traveling over the concentric portion of the cam 220, the rear end of the lever is thereby held up, and it acts through the mechanism described, to hold the carrier shafts 48 and the forward portion of the carrier in their uppermost positions. In the position which is shown in full lines in Fig. 6, the baskets are held high enough to clear the front wall of the coating bath receptacle. Immediately after the baskets have been charged by the feed roll 86, the roller 223 passes off the high portion of the cam 220 to the lower portion thereof by a quick descent, so as to submerge the baskets and their contents in the coating bath contained in the receptacle 40.

There is provided beneath the coating bath receptacle a second receptacle 235 adapted to contain a body of liquid, the character of which depends upon the product being coated. When coating nuts or confections with chocolate, this body of liquid will preferably be a vegetable oil which is compatible with the coating liquid. When coating confections with icing, this fluid in said receptacle 235 may and preferably will be water. The contents of the said receptacle may be heated in any suitable manner, as by a heating coil or by a gas burner 236, the latter being shown in Fig. 6. The baskets are passed through the liquid in said receptacle 235 in order to cleanse the baskets of any coating material which may cling to them, so that the baskets may pass back into the coating bath tank comparatively free from the coating liquid.

The rising and falling movements given to the forward carrier supporting shafts cause the baskets to be dipped or submerged into the liquid in the receptacle 235. At the same time the baskets, which have theretofore been filled with the product are dipped into the coating bath. This descent of the empty baskets into the cleansing liquid is rapid so as to thereby facilitate the cleansing action of the liquid thereon, and the descent of the charged baskets into the body of coating liquid is likewise rapid.

While the machine herein shown is a dipping machine, it will be obvious that some of the features thereof are adapted to other types of machines, as for instance, a pouring machine.

As before stated, it will be obvious that the structural details of many features of the machine may be considerably varied without departure from the spirit and scope of the invention, and the invention is not limited to such details except as hereinafter made the subject of specific claims or as imposed by the prior art.

I claim as my invention:—

1. A coating machine comprising an endless traveling carrier, with means to impart thereto an intermittent movement, said carrier embracing pendant, open topped skeleton containers, feed means for feeding the product to said containers, means to apply a coating material to the product in said containers, and means whereby the product is discharged from the lower ends of the said containers.

2. A coating machine comprising an endless traveling carrier, with means to impart thereto intermittent movement, said carrier embracing open topped skeleton containers, feed means for feeding the product to the said containers, and means to apply a coating material to the product in said containers, said containers being spreadable at their lower ends to open them and to thereby discharge the coated product through said lower ends.

3. A coating machine comprising a carrier, with means to impart thereto an intermittent movement, said carrier embracing open topped containers, feed means for feeding the product to said containers, means to apply a coating material to the product in said containers, said containers comprising pendant wires which are spreadable at their lower ends to open the containers and to thereby discharge the product therefrom, and means located in the path of the carrier and co-acting with the containers to so open them.

4. A coating machine comprising a carrier, with means to impart intermittent movement thereto, said carrier embracing open topped containers, feed means for feeding the product to said containers, means for applying a coating material to the product in said containers, said containers being spreadable at their lower ends to open them and to thereby discharge the coated product from the said lower ends, and means located in the path of the carrier and coacting with the containers to so open them, comprising means to first partially open the containers and permit them to close and to thereafter fully open the containers.

5. In a coating machine, a carrier, with means to operate it, said carrier embracing a series of open topped, pendant, basket-like containers made of two parts and spreadable at their lower ends to discharge the coated product, and means to control the opening of the containers, constructed to give preliminary movement to the movable part of the container prior to the full opening movement thereof.

6. A coating machine comprising a carrier, consisting of endless belts, pulleys about which the belts are trained, with means for giving movement to said belts, said carrier comprising also groups of pendant, skeleton containers extending transversely between the belts, with means to apply a coating fluid to the product in said containers, and means whereby the product is automatically discharged from the lower ends of said containers.

7. A coating machine comprising a carrier consisting of endless belts, pulleys about which the belts are trained, with means for giving movement to said belts, said carrier comprising also twin transverse bars which extend between and are supported on the belts, with spreadable, basket-like containers depending therefrom, means to apply a coating material to the product in said containers, and means acting on one of the twin bars to spread the containers at their lower ends to discharge the contents thereof.

8. A coating machine comprising a carrier consisting of endless belts, pulleys about which the belts are trained, with means to give movement to the belts, said carrier comprising also a plurality of groups of containers, each group consisting of twin bars, one of which is supported on the belts and the other of which is rockingly mounted on the belt supported bar, and wires depending from the twin bars to constitute basket like containers the lower ends of which are adapted to be spread apart by the rocking movement of said rocking bar, and means to apply a coating material to the product in said containers.

9. A coating machine comprising a carrier consisting of endless belts, pulleys about which the belts are trained, with means to give movement to the belts, said carrier comprising also a plurality of groups of containers, each group consisting of twin bars, one of which is supported on the belts and the other of which is rockingly mounted on the belt supported bar, and wires depending from the twin bars to constitute basket like containers, the lower ends of which are adapted to spread apart by rocking movement of the rocking bar, means located in the path of the carrier to act on each rocking bar to rock the same and to thereby open the associated basket like containers, and means to apply a coating material to the product in the said containers.

10. In a coating machine, a carrier provided with an openwork or skeleton container open at its upper end and spreadable at its lower end to discharge the contents thereof.

11. In a coating machine, a carrier comprising two bars, one of which is rockingly mounted on the other, two sets of wires depending from and carried one by each of said bars to form the open topped basket like containers, whereby rocking movement of one of said bars serves to spread the said depending wires and means acting on the rocking bar to normally close the containers.

12. In a coating machine, a carrier comprising a group of containers, each group consisting of two bars, one of which is rockingly mounted on the other, and skeleton members depending from the bars to form basket like containers, the lower ends of which are spreadable by rocking movement of the rocking bar, springs acting on the rocking bar to hold the containers closed and stops to limit the movement of the rocking bar.

13. In a coating machine, a carrier comprising endless belts, twin bars extending between the belts, one of which is supported by the belts and the other of which is rockingly mounted on the belt supported bar, members depending from said bars to constitute skeleton basket like containers and adapted to be spread at their lower ends by rocking movement of the rocking bar to open the containers, a projection on the rocking bar and a tripping cam in the path of and adapted to engage said projection to rock said bar to thereby spread or open the lower ends of the containers.

14. In a coating machine, a carrier comprising endless belts, twin bars extending between the belts, one of which is supported by the belts and the other of which is rockingly mounted on the belt supported bar, members depending from said bars to constitute skeleton basket like containers and adapted to spread at their lower ends by rocking movement of the rocking bar to open the containers, a tripping projection on the rocking bar, a movably mounted tripping cam in the path of said projection and a rotative cam having an eccentric projection to raise the tripping cam into the path of the said tripping projection.

15. In a coating machine, a carrier comprising endless belts, twin bars extending between the belts, one of which is supported on the belts and the other of which is rockingly mounted on the belt supported bar, spreadable members depending from the said bars to constitute basket like containers, a tripping projection on the rocking bar, a movably mounted tripping cam in the path of the said projection and a rotative cam provided with a short eccentric projection to first actuate the tripping cam to partially tilt the container members, and with a longer eccentric projection to subsequently actuate the tripping cam to fully tilt the container members.

16. In a coating machine, the combination with a carrier provided with a plurality of transversely disposed series of containers with the series spaced longitudinally of the carrier, and means to intermittently actuate the carrier, of a feed hopper above the carrier, a feed roll rotative between the hopper and carrier provided with a plurality of angularly spaced series of pockets with the pockets of each series spaced longitudinally of the roll, for transferring the individual pieces of product from the hopper to the containers, the longitudinal spacing of the pockets corresponding to the transverse spacing of the containers, and the angular spacing of the pockets corresponding to the spacing of the series of containers along the carrier, with means for intermittently actuating the roll, and chutes individual to the pockets to guide the pieces of product from the pockets to the containers.

17. In a coating machine, the combination with a carrier provided with a plurality of transversely disposed series of containers with the series spaced longitudinally of the carrier, and means to intermittently actuate the carrier, of a feed hopper above the carrier, a feed roll rotative between the hopper and carrier provided with a plurality of angularly spaced series of pockets with the pockets of each series spaced longitudinally of the roll, for transferring the individual pieces of product from the hopper to the containers, the longitudinal spacing of the pockets corresponding to the transverse spacing of the containers, and the angular spacing of the pockets corresponding to the spacing of the series of containers along the carrier, with means for intermittently actuating the roll, chutes individual to the pockets to guide the pieces of product from the pockets to the containers, and means to shake the hopper in a direction longitudinally of the axis of the roll.

18. In a coating machine, the combination with a carrier provided with a plurality of transversely disposed series of containers with the series spaced longitudinally of the carrier, and means to intermittently actuate the carrier, of a feed hopper above the carrier, a feed roll rotative between the hopper and carrier provided with a plurality of angularly spaced series of pockets with the pockets of each series spaced longitudinally of the roll, for transferring the individual pieces of product from the hopper to the containers, the longitudinal spacing of the pockets corresponding to the transverse spacing of the containers, and the angular spacing of the pockets corresponding to the spacing of the series of containers along the carrier, with means for intermittently actuating the roll, chutes individual to the pockets to guide the pieces of product from the pockets to the containers, with means to shake the hopper, and the bottom of the hopper being grooved to direct the product to said pockets.

19. A coating machine comprising a carrier, embracing a plurality of transversely arranged groups of depending containers, means to give intermittent movement to the carrier, means to feed the product to the containers, means to apply a coating liquid to the product while in said containers, and a vibratory shaker bar arranged in the path of the lower ends of said containers and adapted to shake the container during periods of inaction of the carrier.

20. A coating machine comprising an open topped coating bath receptacle, a carrier embracing rockingly mounted depending containers adapted to be submerged into and passed through a coating bath in said receptacle, means to give intermittent movement to said carrier, means at the front end of the receptacle to feed the product to said containers, and means at the rear end of said receptacle arranged in the path of the containers and movable to engage the same for shaking the containers after they have emerged from the bath.

21. A coating machine comprising an open topped coating bath receptacle, a carrier embracing rockingly mounted depending containers adapted to be submerged into and passed through a coating bath in said receptacle, means to give intermittent movement to the said carrier, means at the front end of the receptacle to feed the product to said containers, and a swinging shaker bar extending transversely across the rear end of the receptacle in the path of the lower ends of the containers, with means for swinging said shaker bar.

22. A coating machine comprising an open topped coating bath receptacle, a carrier embracing rockingly mounted depending containers adapted to be submerged into and passed through a coating bath in said receptacle, means to give intermittent movement to said carrier, means at the front end of the receptacle to feed the product to said containers, a swinging shaker bar extending transversely across the rear end of the receptacle in the path of the lower ends of the containers, a vibratory lever pivoted between its ends to the machine frame, a link connecting one end of said lever to said shaker bar, and a rotating shaft provided with a crank for actuating the other end of said lever.

23. A coating machine comprising an open topped coating bath receptacle, a carrier comprising belts, front and rear pairs of pulleys about which said belts are trained, with means for giving movement to the carrier, transverse groups of containers depending from the laps of said belts, the front pair of pulleys being vertically movable, and means for giving vertical movement to said latter pulleys.

24. A coating machine comprising an open topped coating bath receptacle, a carrier comprising belts, front and rear pairs of pulleys about which said belts are trained, with means for giving movement to the carrier, transverse groups of containers depending from the laps of said belts, means at the front end of said receptacle for feeding product to the containers, said front pair of pulleys being vertically movable, and means to hold the carrier with the containers in position to receive the product from the feeding means and arranged to depress said front pair of pulleys immediately after the product has been fed thereinto so as to submerge both the containers and product into the coating bath.

25. A coating machine comprising an open topped coating bath receptacle, a carrier comprising belts, front and rear pairs of pulleys about which said belts are trained, with means for giving movement to the carrier, transverse groups of containers depending from the laps of the belts, means at the front end of said receptacle for feeding the product to the containers, said front pair of pulleys being vertically movable, means to hold the carrier with the containers in position to receive the product from feeding means and arranged to depress said front pair of pulleys immediately after the product has been fed thereinto so as to submerge both the containers and product therein into the coating bath, and a cleansing liquid receptacle beneath the coating bath receptacle into which the depending containers of the lower laps of the belts are submerged during the lowering of said front pair of pulleys.

26. A coating machine comprising an open topped coating bath receptacle, a movable carrier comprising belts arranged with their upper laps above and their lower laps below said receptacle, front and rear pairs of pulleys about which said belts are trained, front and rear shafts carrying said pulleys, the rear shaft being mounted in fixed bearings and connected to carrier actuating means, vertically movable bearings in which the front shafts are mounted, means for giving vertical movement to said front shafts constructed to raise the front pulleys during the time the containers are passing over the front wall of the receptacle and arranged to thereafter lower said shafts to submerge the containers and contents into the coating bath, and means for feeding the product to the containers when said front shafts are in their uppermost positions.

27. A coating machine comprising an open topped coating bath receptacle, an intermittently movable carrier comprising belts arranged with their upper laps above and their lower laps below said receptacle, front and rear pairs of pulleys about which said belts are trained, front and rear shafts carrying said pulleys, the rear shafts being mounted in fixed bearings, and connected to carrier actuating means, vertically movable bearings in which the front shafts are mounted, means for giving vertical movement to said front shafts constructed to raise the front pulleys during the time the containers are passing over the front wall of the receptacle and arranged to thereafter lower said shafts to submerge the containers and contents into the coating bath, means for feeding the product to the containers when the front shafts are in their uppermost position, and means for forcing the product into the bottoms of said containers when lowered into the coating bath.

28. A coating machine comprising an open topped coating bath receptacle, a movable carrier comprising belts arranged with their upper laps above and their lower laps below said receptacle, front and rear pairs of pulleys about which said belts are trained, front and rear shafts carrying said pulleys, the rear shaft being mounted in fixed bearings and connected to carrier actuating means, vertically movable bearings in which the front shafts are mounted, guides on the frame on which said bearing are vertically guided, a rock shaft, crank arms thereon connected to said front shafts of the carrier, and cam actuated means for rocking the rock shaft.

29. In a coating machine, a coating bath receptacle, an endless carrier equipped with containers to receive the product to be coated, with means to support the carrier and to move it through the bath in said receptacle, means above the carrier to feed the product to said containers, the carrier support being vertically movable, and means to raise the carrier to the feeding means as the containers pass the same and to thereafter depress the carrier to submerge the containers in the bath.

30. A coating machine comprising an open topped coating bath receptacle, a carrier comprising endless belts, front and rear pairs of pulleys about which said belts are trained, containers depending from the laps of the said belts, means at the front end of the receptacle for feeding product to the containers, the front pair of pulleys being vertically movable, with means for lowering them after the product had been fed thereto, and means for forcing the product into the lower ends of the containers while being lowered into the coating bath.

31. A coating machine comprising an open topped coating bath receptacle, a carrier comprising endless belts, front and rear pairs of pulleys about which the belts are trained, containers depending from the laps of said belts, means at the front end of the receptacle for feeding product to the containers, the front pair of pulleys being vertically movable, with means for lowering them after the product has been fed thereto, said containers being of open work or basket like structure, a rock shaft at the front end of the receptacle provided with a plurality of fingers, and means to rock said shaft to swing said fingers rearwardly and downwardly through the basket like containers to depress the product into the lower ends of said containers.

32. In a coating machine the combination with a carrier equipped with a series of open work or basket like containers, means to feed the product into said containers, of means to depress the containers into and pass the same through a coating bath, of means to force the product into the lower ends of the containers.

33. In a coating machine, the combination with a carrier equipped with a series of open work or basket like containers, means to feed the product into said containers, and means to depress the containers into and pass the same through a coating bath, of a rock shaft in front of the loading position of the containers provided with a plurality of fingers, and means for rocking said shaft to swing said fingers rearwardly and downwardly through the containers.

34. In a coating machine, the combination with a carrier equipped with a series of open work or basket like containers, means to feed product into said containers, and means to depress the containers into and pass the same through a coating bath, of a rock shaft in front of the loading position of the containers provided with a plurality of fingers, said rock shaft being provided with a crank arm, and a cam actuated pivoted lever having a link for connecting it to the crank arm of said rock shaft.

35. A coating machine comprising an endless carrier embracing containers for the product, and supporting and driving pulleys for the carrier, means for feeding product to said containers, means for applying a coating liquid to the product in said containers, means for discharging the coated product from said containers, a take-off belt to receive the discharged coated product, and means for imparting lateral movement to the take-off belt when the product is delivered thereto.

36. A coating machine comprising an endless carrier embracing containers for the product, and supporting and driving pulleys for the carrier, means for feeding product to said containers, means for applying a coating liquid to the product in said containers, means for discharging the coated product from said containers, a take-off belt to receive the discharged coated product, means for raising and lowering the receiving part of the take-off belt, and means coacting with the raising and lowering movement of the belt to impart lateral vibratory movement to said belt.

37. A coating machine comprising an endless carrier embracing containers for the product, and supporting and driving pulleys for the carrier, means for feeding product to said containers, means for applying a coating liquid to the product in said containers, means for discharging the coated product from said containers, a take-off belt to receive the discharged coated product, means for raising and lowering the receiving part of the take-off belt, a member on the machine frame having a vertically fluted surface, and a roller movable with the take-off belt to engage said fluted surface to thereby impart lateral vibratory movement to the take-off belt during the vertical movement of the latter.

38. In a coating machine, an endless carrier provided with means to receive and hold the product during the time the coating fluid is applied thereto, and adapted to discharge the coated product, with supporting and driving pulleys for the carrier combined with a takeoff belt to receive the coated product from the holding means, and means for imparting lateral vibratory motion to the belt during the time the coated product is delivered thereto.

39. In a coating machine, an endless carrier provided with means to receive and hold the product during the time the coating fluid is applied thereto, and adapted to discharge the coated product, with supporting and driving pulleys for the carrier combined with a take-off belt to receive the coated product from the holding means, a frame for said take-off belt, means for raising and lowering the frame, and coacting means on the take-off belt frame and the machine frame for imparting lateral vibratory movement to the take-off belt and its frame, during the time the belt is being lowered.

40. In a coating machine, a carrier provided with means to receive and hold the product during the time the coating fluid is applied thereto, and adapted to discharge the coated product, combined with a take-off belt to receive the coated product from the holding means, a frame for said take-off belt, a rocking cam on which said frame is supported, a rotative cam for giving movement to the rocking cam, a shaft on which the rotative cam is mounted, an eccentric fixed to said shaft, a driving roller for the take-off belt, a ratchet thereon and a jointed lever actuated by said eccentric and provided with a pawl acting on said ratchet wheel to drive said take-off belt roller.

41. In a coating machine, the combination with a container for the product, with means for applying a coating material to the product in said container, of a take-off belt upon which the coated product is delivered, a driving roller for said belt and means for laterally vibrating said roller and the belt as the product is delivered on the belt.

42. In a coating machine, the combination with a container for the product, with means for applying a coating material to the product in the container, of a take-off belt upon which the coated product is delivered, a raisable and lowerable frame for the belt, a driving roller for the belt, a frame for the belt movable laterally to the raisable and lowerable frame and means for giving lateral vibratory movement to said belt and roller during the rising and falling movement of said frame.

In testimony, that I claim the foregoing as my invention I affix my signature in the presence of two witnesses, this 25th day of July, A. D. 1913.

FRANK H. WOOLF.

Witnesses:
G. E. DOWLE,
W. L. HALL.